J. ENGEL.
Combined Tippet and Muff.
No. 161,332. Patented March 30, 1875.
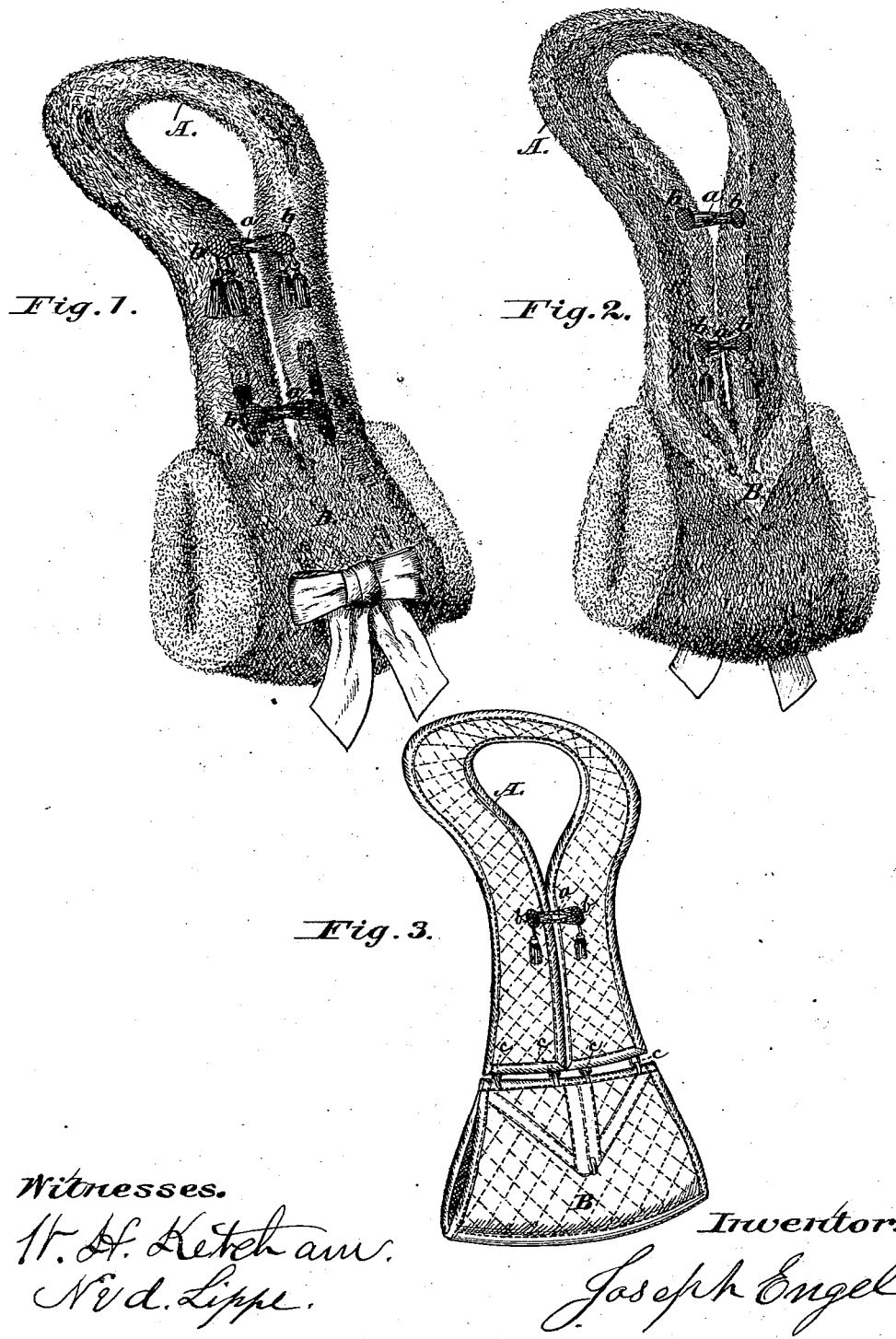

UNITED STATES PATENT OFFICE.

JOSEPH ENGEL, OF FRANKFORT-ON-THE-MAIN, GERMANY, ASSIGNOR OF ONE-HALF HIS RIGHT TO GEORGE L. PALMER, OF WILKESBARRE, PA.

IMPROVEMENT IN COMBINED TIPPETS AND MUFFS.

Specification forming part of Letters Patent No. 161,332, dated March 30, 1875; application filed August 17, 1874.

*To all whom it may concern:*

Be it known that I, JOSEPH ENGEL, of Frankfort-on-the-Main, Germany, have invented a new and Improved set of Furs for Ladies and Misses, of which the following is a full and clear description:

This improvement consists of a combined and reversible collar and muff. The collar, of any style and shape, may be permanently attached to the muff, or detachably connected by loops and buttons, or any suitable device, so that they may be used together or separately, at pleasure. The collar and muff are so constructed that one side is of one kind of fur or material, and the other side of any other kind, so that by simply reversing the collar and muff a different set of furs will be secured.

Figures 1 and 2 represent the different sides of the collar and muff when united permanently; and Fig. 3 represents the two separated, showing the attachments for connecting them at pleasure.

Similar letters of reference indicate corresponding parts.

A represents the collar, of any style; and B, the muff; *a a* and *b b*, front fastenings; *c c*, Fig. 3, indicate the fastenings for detachably connecting the muff and collar.

By this invention is furnished an article convertible into several different styles of furs.

Having described my invention, what I claim as new, and desire to secure by Letters Patent, is—

1. A combined tippet and muff, finished and provided with fastenings upon both sides, to adapt it to be reversible, so as to be worn either side out, substantially as described and shown.

2. A combined tippet and muff, detachably connected, and made to be reversible, substantially as described and shown.

JOSEPH ENGEL.

Witnesses:
W. H. KETCHAM,
NED LIPPE.